United States Patent [19]

Bjorklund

[11] Patent Number: 4,601,789

[45] Date of Patent: Jul. 22, 1986

[54] WATER PURIFICATION APPARATUS

[75] Inventor: John G. Bjorklund, 2127 Simpson Ave., Ocean City, N.J. 08226

[73] Assignees: John G. Bjorklund; Shirley W. Bjorklund; Leona House; Leonard J. House, all of Ocean City, N.J.

[21] Appl. No.: 639,782

[22] Filed: Aug. 10, 1984

Related U.S. Application Data

[63] Continuation-in-part of Ser. No. 493,761, May 11, 1983, abandoned.

[51] Int. Cl.$^4$ .......................... B01D 3/02; B01D 3/42
[52] U.S. Cl. .................................. 202/167; 202/181; 202/182; 202/185 A; 202/197; 202/206; 202/235; 203/4; 203/10; 203/23; 203/40; 203/DIG. 8
[58] Field of Search .................... 203/10, 11, 4, 21, 22, 203/40, 23, 27, 91, DIG. 8, 1, 2; 202/166, 167, 176, 177, 187, 235, 185.1, 181, 206, 188, 182, 197; 126/344, 389, 381

[56] References Cited

U.S. PATENT DOCUMENTS

| | | | |
|---|---|---|---|
| 21,693 | 10/1858 | Normandy | 203/10 |
| 849,210 | 4/1907 | Daley et al. | 202/177 |
| 1,061,359 | 5/1913 | Daley et al. | 202/166 |
| 1,362,666 | 12/1920 | Badger | 203/10 |
| 1,635,112 | 7/1927 | Carlson et al. | 203/10 |
| 2,217,266 | 10/1940 | Cookson | 202/177 |
| 2,803,590 | 8/1957 | Skow | 203/10 |
| 3,029,068 | 4/1962 | Skow | 203/DIG. 17 |
| 3,454,470 | 7/1969 | Guarino | 202/177 |
| 3,725,209 | 4/1973 | Rosa | 202/187 |
| 3,907,683 | 9/1975 | Gilmont | 202/197 |
| 3,935,077 | 1/1976 | Dennison | 203/10 |
| 3,980,526 | 9/1976 | Kirschmann | 203/10 |
| 4,035,240 | 7/1977 | McLean | 202/167 |
| 4,265,712 | 5/1981 | McLean | 202/166 |
| 4,415,075 | 11/1983 | McNesky et al. | 202/177 |

Primary Examiner—S. Leon Bashore
Assistant Examiner—V. Manoharan
Attorney, Agent, or Firm—Thomas A. Lennox

[57] ABSTRACT

A water purification and hot water supply apparatus is provided including a feed water intake providing water in excess of the distilled water output, a heater controlling the quantity of water boiled, a waste water exit port to remove accumulated water above a certain level, a distilled water exit port in the vapor space, a condensing device to transfer the heat of condensation to a hot water tank and a waste water heat exchange device to transfer heat from the waste water to the hot water tank. A volatile organic compound removing tank to heat and vent off the contaminants is positioned to receive heat from the water in the still section of the apparatus which then feeds water to the feed water intake.

10 Claims, 5 Drawing Figures

WATER PURIFICATION APPARATUS

This application is a continuation-in-part application of application Ser. No. 06/493,761 filed May 11, 1983, abandoned.

BACKGROUND OF THE INVENTION

This invention relates to a water purification and hot water supply apparatus, and in particular, a water distillation apparatus capable of supplying the hot water needs to the common household.

There is need for a compact apparatus capable of supplying distilled water in combination with a common household hot water heater, powered by gas, electric, or solar energy. There has long been a continuing need of relatively small quantities of purified and distilled water for household use. The need is now greatly increased. The continuing needs for steam irons, contact lens cleaning, and the like, continue in importance, but are small. Now, with the ever increasing difficulties of retaining ingestive water purity, a distilling apparatus in the home may well be a necessary appliance of the future. In certain locations of the country, distilling the water is the only practical way to make the water potable. Since hot water heaters are a nearly universal home appliance, a combination apparatus to provide a family supply of distilled water and common hot water with little or no energy cost increase is of great interest.

In the U.S. Pat. No. 4,265,712, a water purification system is described by the inventor Peter J. McLeon for use in combination with a domestic hot water heating tank. Another water purification system is described in an earlier patent to the same inventor in U.S. Pat. No. 4,035,240. A much earlier hot water system is described in U.S. Pat. No. 1,061,359 to D. W. Daley et al. None of these systems provide a distillation apparatus capable of continuous use, solving the problem of high concentration of contaminants and solids in the distilling pot and the use of heat energy from the system.

SUMMARY OF THE INVENTION

It is a primary object of this invention to provide a water distillation apparatus which will provide a quantity of distilled water and hot water sufficient for a family use without significantly increasing the energy usage.

It is an additional object of this invention to provide a compact, simple water distilling apparatus that will use the heat of condensation and the latent heat to heat the water in a common domestic hot water heating tank.

It is an additional object of this invention to provide a distilling apparatus with essentially no moving parts but with the ability to control the quantities of the distilled water and removal of the waste water.

It is a further object of this invention to provide a compact distillation apparatus, capable of transferring the heat of condensation of the distilled water and the heat in the waste water to hot water in a hot water tank.

It is a particular object of this invention to provide a distillation unit that operates on a minimal amount of energy by transferring most of the heat required to form the distilled water, back to the medium of the common household hot water heater water.

It is a further object to provide a distillation apparatus that limits the quantity of contamination and solids in the distillation pot.

It is an additional object of this invention to provide a device for the removal of volatile organic compounds from water supplies in a small compact unit.

It is further object of this invention to provide an apparatus for the removal of volatile organic compounds that will not directly interfere with the distillation procedure required to remove solid inorganic materials from the water supply and provide a continuous supply of organic material free water to the distillation unit.

The invention is a water distilling and hot water heating apparatus including an enclosed and essentially vapor-tight container, that might be generally described as the distilling pot. This container is capable of holding a quantity of water while leaving a vapor space above a certain chosen level. A feed water intake is connected to the container capable of providing a water rate of flow in excess of the rate of flow intended to be taken off as distilled water. A heating device is connected to the container to heat the water to boil. This heating device is preferably controlled such that heat quantity may be varied, thus varying the quantity of water boiled into the vapor space in the container and ultimately driven out of the container. A waste water exit port device is connected in the container to remove any accumulated liquid water above a certain chosen level in the container. A distilled water exit port device is positioned above the water level in the vapor space of the container capable of drawing water vapor out of the container. A hot water tank capable of holding a supply of hot water is equipped with a cold water feed and a hot water draw. A condensing device is connected to the distilled water exit port to carry the water vapor and transfer the heat of the condensation to the water in the hot water tank. A waste water heat exchange means is connected to the waste water exit port to transfer heat from the waste water to the water in the hot water tank.

DESCRIPTION OF PREFERRED EMBODIMENTS

Figure 1:
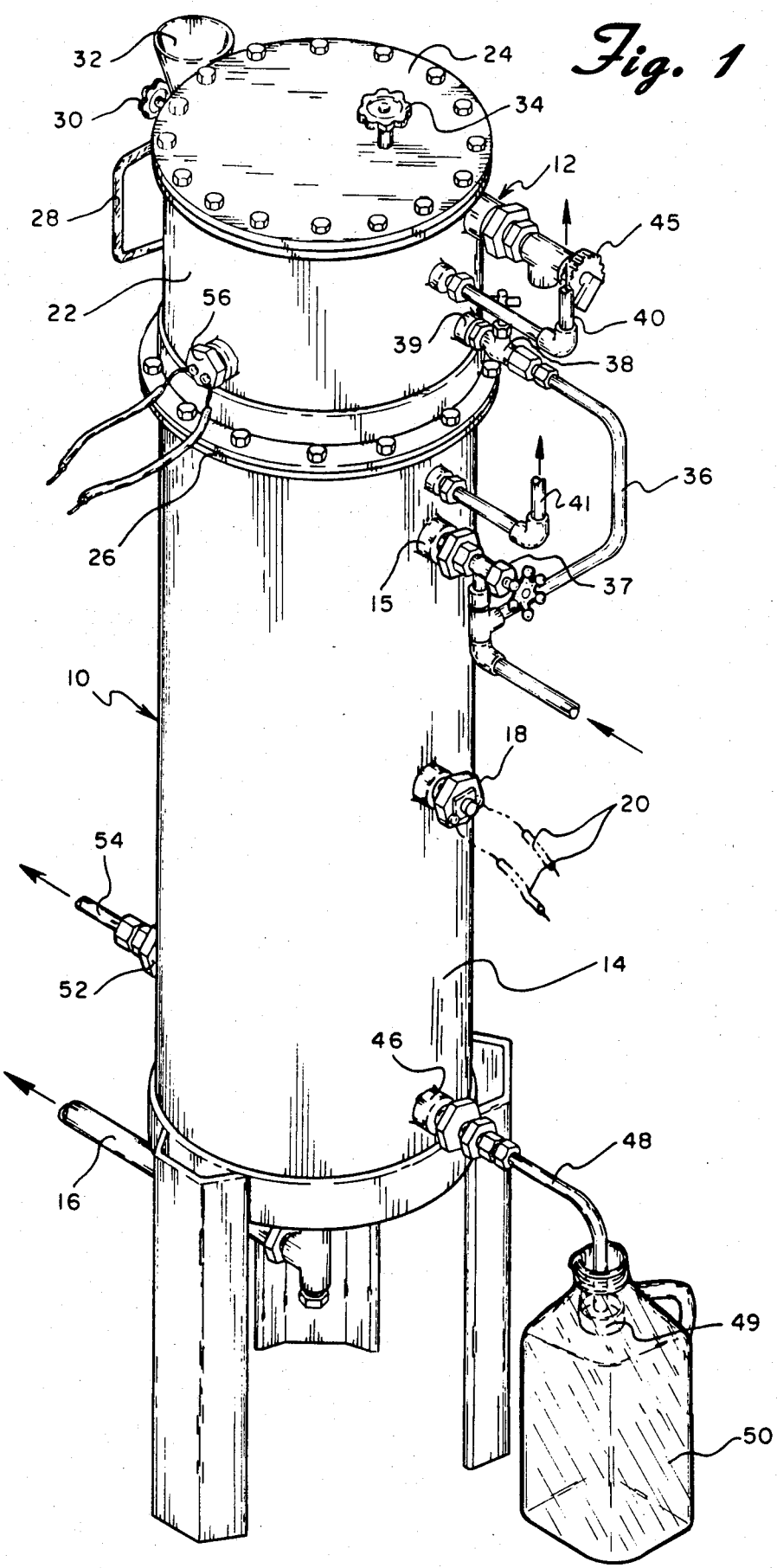
FIG. 1 is a perspective view of a distilling and hot water supply apparatus of the present invention.

Using the distilling apparatus illustrated in FIGS. 1 through 5, a method of distilling water includes providing an enclosed essentially vapor tight container capable of holding a quantity of water leaving a space in the container above the water and heating the water in the container to boil. The method also includes removing distilled water vapor to a distilled water exit port located above the water level in the space, and continuously the water above a certain height level in the container through a waste water exit port. The method further includes connecting the distilled water exit port and the waste water exit port to heat transfer means to transfer the heat of condensation and the latent heat to the water in a supply of household hot water. It is preferred that the feed water rate of flow and heating quantity be adjusted until the flow rate out of the exit port is essentially one-half of the feed water input rate. To state it another way, it is preferred that the heating quantity be adjusted to drive distilled water out of container at a flow rate approximately equal to that of the waste water flow rate out of the container. It is preferred in the apparatus that the waste port be capable of removing water at a rate at least one-half that of the feed water intake. The preferred waste water exit port device includes a vertical tube having an opening at a certain height level within the container with the opening of a size to continuously remove any water accumulating above that level and that tube is within an air tight housing with a housing aperture located at a height below that of the tube opening. It is preferred that a plate be attached to the vertical tube and positioned below the housing aperture, wherein the plate is of a horizontal plane area larger than the horizontal plane area of the aperture. In particular, the preferred waste water exit port includes a vertical tube opening at the water level to be maintained with the tube opening inside a vertical cylinder closed at the upper end and open at the lower end, with the open end of the cylinder extending below the water level. A circular plate is attached to the vertical tube and positioned below the housing aperture wherein the plate is of a diameter larger than the cylinder diameter. It is preferred that the feed water intake be connected through a pipe capable of drawing water from the inlet cold pipe. The preferred distilled water exit port device includes a vertical tube extending into the vapor space with an opening in the tube into the vapor space and a protecting device to prevent droplets of water from entering the opening. The preferred protecting device is a curve in the tube to place the opening in a vertically downward direction.

In areas of the country where there is a threat and a danger of contamination of the water supply from improper dumping, relatively volatile toxic organic materials may be present in the inlet feed water. A preferred embodiment includes a second enclosed, essentially vapor tight, container also referred to as a closed chamber device to hold quantity of water but leaving a vapor space above a certain level positioned inside the first container. Preferably, this second container may be formed by three or four walls in combination with the walls of the first container. The feed water inlet opens into this second container and all feed water passes through this container before entering the first container to be distilled. The second container has an outlet positioned at a height below the water level in the first container. Thus, the water in both container will adjust and seek a common level. A vapor vent is provided in the second container venting vapors to the atmosphere to remove the volatile organic materials. The second container is constructed and positioned inside the first container such that there is substantial heat transfer from the heated water in the first container such that the water in the second container approaches that of the boiling point. Actually, it is effective to heat the water to the range of 150 to 200 degrees and preferably about 180 degrees providing efficient forcing off of the volatile organic compounds. If the second container is constructed of metal walls, the heat transfer conducted through the walls to the interior water is sufficient to heat the water in the second container to an effective level. The volatile organic compound removing device is preferably positioned inside the still, but may be positioned any place so long as it is in heat conduction communication with the water in the distilling container. The outlet from the volatile organic compound removing device is an under water aperture and is sized and positioned to provide a detention of the water in a smaller container allowing the water to flow into the first distilling container only after the temperature of the water in the detention container has been raised to a level to drive off volatile organic compounds from the feed water. The volatile organic compound removing device vents to the atmosphere essentially all volatile organic compounds and includes a second container positioned in heat conduction communication with the water in the first container and having an inlet to the feed water intake to the device. A detention device outlet device allows the water in the second container to flow into the first container after the temperature of the water in the second container has been raised to a level to drive off the volatile organic compound.

Using the perspective view of FIG. 1, distillation and hot water supply apparatus 10 includes distillation section 12 on top of standard household hot water tank 14 of standard construction of 42 gallon capacity, equipped with cold feed water intake 15 in direct communication with the interior of tank 14. The water in tank 14 may, if necessary, depend on for general use on heat by 1000 watt electric heater 18. For most family usage, the heat from distillation section 12 obtained from heaters 56 and 57 (hidden) will be sufficient to heat the water in tank 14 to the range temperature of 120 degrees to 150 degrees Fahrenheit taken for family usage from outlet pipe 16. Approximately 90 percent of the family hot water needs will be heated from the distillation unit. Distillation section 12 includes a pot enclosure constructed of cylindrical sidewalls 22, top 24, and bottom plate 26 forming an interior volume 58 as further illustrated in FIG. 2. Although not illustrated, the entire distillation section 12 apparatus and of course the standard household hot water tank is insulated from the ambient area. There is also insulation between distillation section 12 and the hot water tank top as described further below. Sight glass 28 allows the water level in volume 58 within distillation apparatus 12 to be read. Connected to the supply of sight glass 28 are vertical valve 30 and funnel 32 into which a cleaning solution, such as acid, may be be added to remove any minor scale buildup in the distillation section. Drain valve handle 34 attaches to a stem extending downwardly through top plate 24. The housing pot for distillation apparatus 12 is constructed by bolting the three parts together with suitable gasketing material. Make-up feed water line 36 connects to valve 37 and the feed cold water supply to opening 39 as controlled by valve 38 into the housing pot of distillation apparatus 12. Distillation section 12 is equipped with a three psig pressure relief valve 45 in case the outlet becomes plugged. There are two flow outlets from the distillation apparatus 12 opening into two copper heat transfer tubes passing through tank 14, one to distilled water exit port 46, equipped with a line 48 to distillation water storage container 50. The other exit port, also connected to heat transfer tube passing through tank 14, opens at waste water exit port 52 connected to waste line 54. Vent tube 40 is open and is in direct communication with a separate compartment inside and heated from distillation section 12 and provides an outlet for removal of volatile organic compounds that are distilled off at temperatures below the boiling point of water. Vent tube 41 provides gas escape from the main water tank 14.

Figure 2:
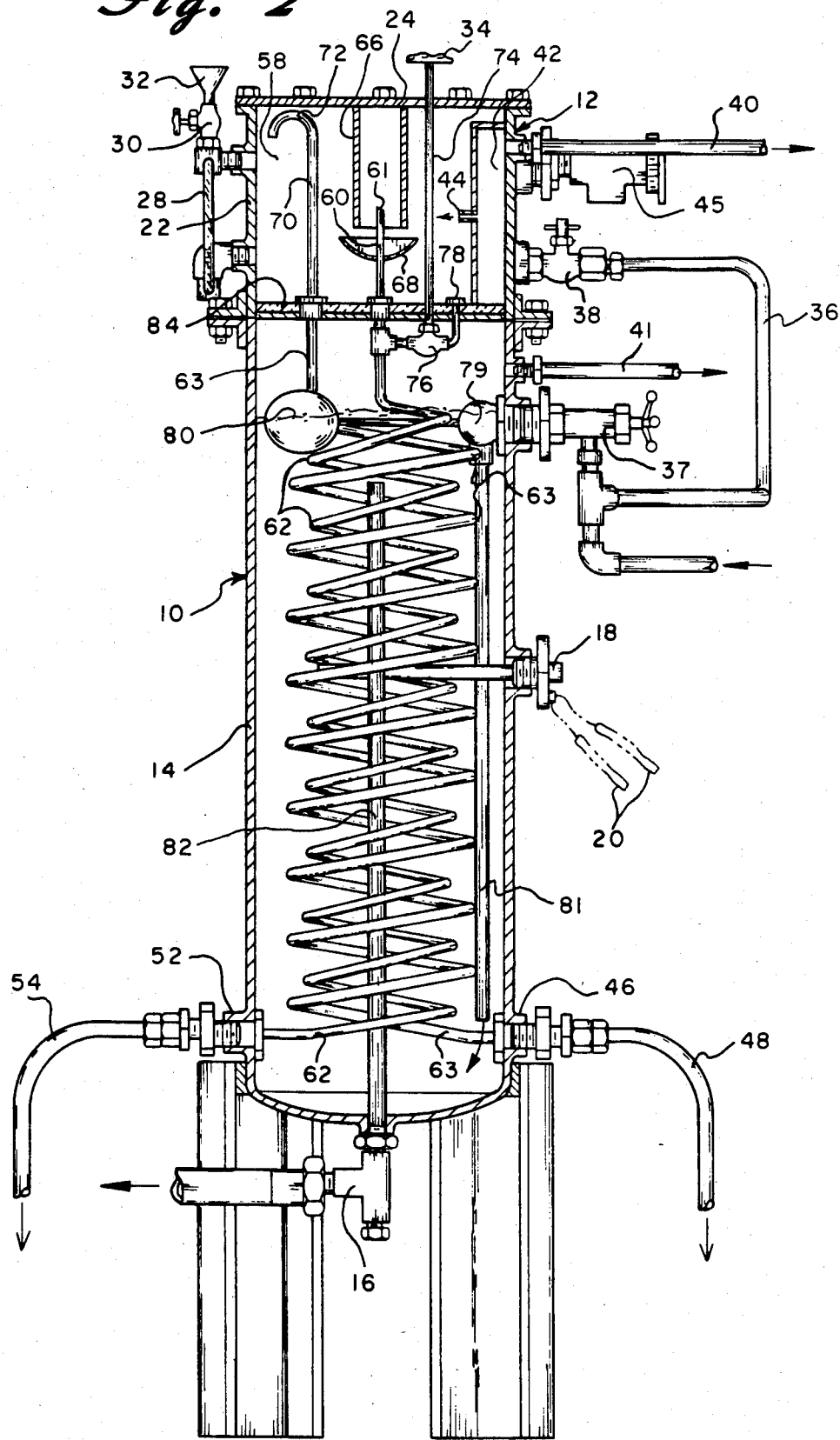
FIG. 2 is a vertical, cross-sectional view of FIG. 1 displaying the interior of the distilling apparatus and the hot water tank.

In FIG. 2, a vertical cross-sectional view is taken, opening up the interior of distillation apparatus 10 and hot water tank 14. Make-up feed water line 36 connects to opening 39 to feed water (preferably cold although it may be hot) into interior volume 58 which will fill to a level close to the top of opening 61 of vertical waste water tube 60, to allow waste water to continuously drain out through coiled copper tubing 62 in tank 14, to water outlet 52 to line 54 to discard. As cold water feed enters opening 39, it must first pass through volatile organic removing chamber 42 essentially in the form of a box enclosed by walls 43 and having opening 44 which opens below water level into the balance of the water supply in interior volume 58. The water in chamber 42 is heated by the surrounding water to a temperature approaching that of boiling before it passes through opening 44 into the main body of water. Volatile organic materials are driven off and out of gas vent tube 40. Waste water coiled copper tube 62 extending through the length of the interior of tank 14 filled with water is an effective heat transfer device to transmit the accumulated heat to the cooler water in the hot water tank. Inverted cylinder 66 attached to and closed at the top to top plate 24 extends around and downwardly past the height of opening 61 and thus past the height of the expected water level after apparatus 12 comes to equilibrium with water flowing continuously out of opening 61. Barrier 68 is essentially a circular plate connected to the exterior of tube 60 in roughly a horizontal plane angled slightly upwardly at a height below the water level and extending outwardly past the circumference of inverted cylinder 66 to divert steam bubbles from accumulating within the interior of cylinder 66. Distilled water vapor exit tube 70 extends to and opens at a height above the expected level close to the top of interior volume 58. The "U" shaped top 72 is intended as a barrier to prevent the intrusion of water droplets condensing on the top plate 24. Tube 70 is connected to coiled copper tube 63 which passes in loops through the interior of tank 14 acting as a heat transfer device to transfer the heat of condensation and the heat from the hot condensed water to the coler water in the hot water tank, finally connected to distilled water exit port 46, which in turn is connected to line 48 in communication to vacuum liquid seal overflow cup 49 which overflows to storage container 50 of the distilled water. Valve handle 34 turns valve stem extension 74 to open or close valve 76, to allow draining during shutdown, of the water in interior volume pot 58 through drain hole 78, into tube 62 and ultimately to the drain for waste. Although it may appear in FIGS. 2 and 3 the pressure relief valve 45 opens into volatile removing container 42, it actually is positioned radially around tank side 22 such that it opens into still volume 58.

The level of the water in tank 14 is controlled by float valve 79 actuated by float 80 which when indicated introduces cold water near the bottom of tank 14 through tube 81. Hot water is drawn from hot water outlet pipe 16 through pipe 82 which extends vertically through the center of tank 14 just below the top of the water level.

Figure 3:
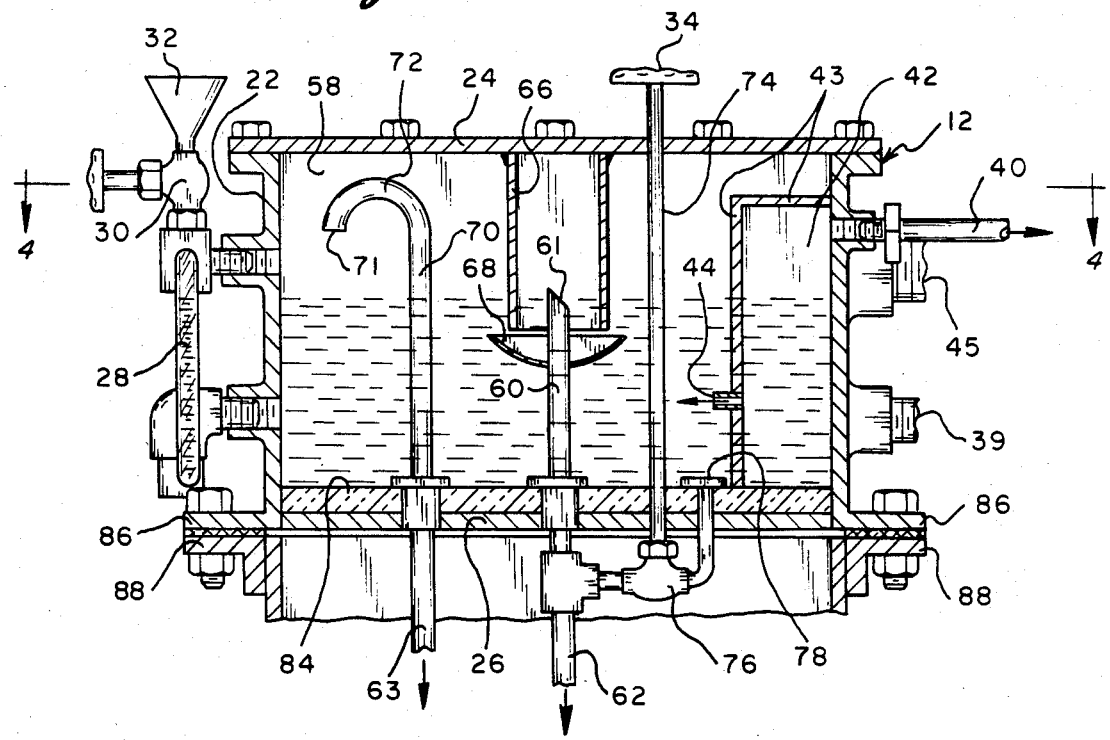
FIG. 3 is an expanded partial cross-sectional view depicting the interior of the distillation apparatus of FIG. 1 showing the water level.

In FIG. 3, an expanded cross-sectional view of the distillation section 12 is provided with water at a level attained when the apparatus is running in an equilibrium condition. In this view, the construction of the enclosure creating interior volume 58 is illustrated wherein each part and size is shown expanded to illustrate the detail. Top plate 24 is bolted to cylindrical sidewall 22 which is welded to bottom plate 26 to form an airtight enclosure. Insulation board 84 essentially covers the entire interior surface of bottom plate 26 to reduce significant heat conduction to the cooler hot water in hot water tank 14. Annular flange 86 is essentially an extension of a bottom plate 26 extending beyond the circumference of cylinder 22. Through bolts and nuts, annular flange 86 is connected, sandwiching gasket 90 between it and corresponding lower annular flange 88 that is welded to the outside surface at the top of tank 14. In this expanded view, the open bottom of cylinder 66 under the water level is illustrated with circular barrier 68 extending outwardly but not impeding the water flow past the barrier and up into the interior of cylinder 66 to the same water level on the outside. Water level increases overflow into opening 61 and drain out through tube 60 to the waste water outlet. As heater 56 boils the water, steam vapor is formed and can escape from interior volume 58 only through distilled water vapor tube 70 connected to tube 63. As long as opening 71 of tube 70 remains above the water level, equilibrium can be attained. The feed water entering through opening 39 feeds into the three quart holding tank compartment 42 that will provide an approximate 90 minute detention. As the water remains in that detention container, water temperature will rise to nearly boiling driving off the organic volatile compounds through vent 40. Ultimately, the water from this detention container flows through opening 44 into the main distillation compartment 58.

Figure 4:
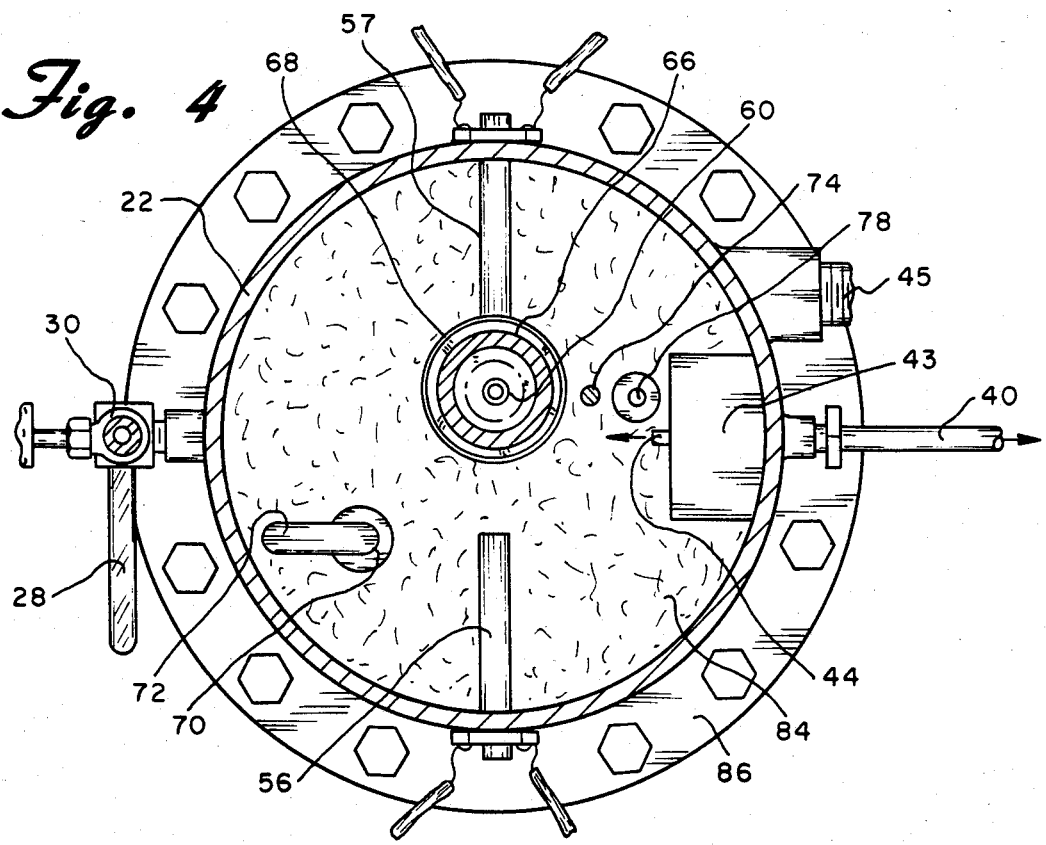
FIG. 4 is a horizontal cross-sectional view taken along line 4—4 of FIG. 3 looking from above to the interior of the distillation apparatus.

The cross-sectional view in FIG. 4 taken along line 4—4 of FIG. 3 illustrate the position of the various elements in distillation apparatus 12. Heaters 56 and 57 extends into interior volume 58 below water level to generate steam leaving through tube 70 past water diverter 72. The cross-sectional view cuts across cylinder 66 so that circular barrier 68 can be seen as connected to tube 60. In operation, make-up water valve 42 is opened to fill interior volume 58 of distillation apparatus 12, until the water level rises to the height of opening 61, and a certain rate of water flow is observed, for example two quarts per hour draining from the waste water exit port 52 with the distillation system cold. Heater 56 is turned on to heat the water flowing through distillation section 12. The heating quantity is adjusted until one-half of the rate of flow coming in from the make-up now drains from the waste water drain. When this is accomplished, the other one-half of the make-up water is being distilled and collected at distilled water exit port 46. In this fashion, the entire solids and impurities entering in the make-up water are passing at twice the original concentration out of waste water exit port 52, and there is essentially no accumulation of contaminants in distillation section 12.

Figure 5:
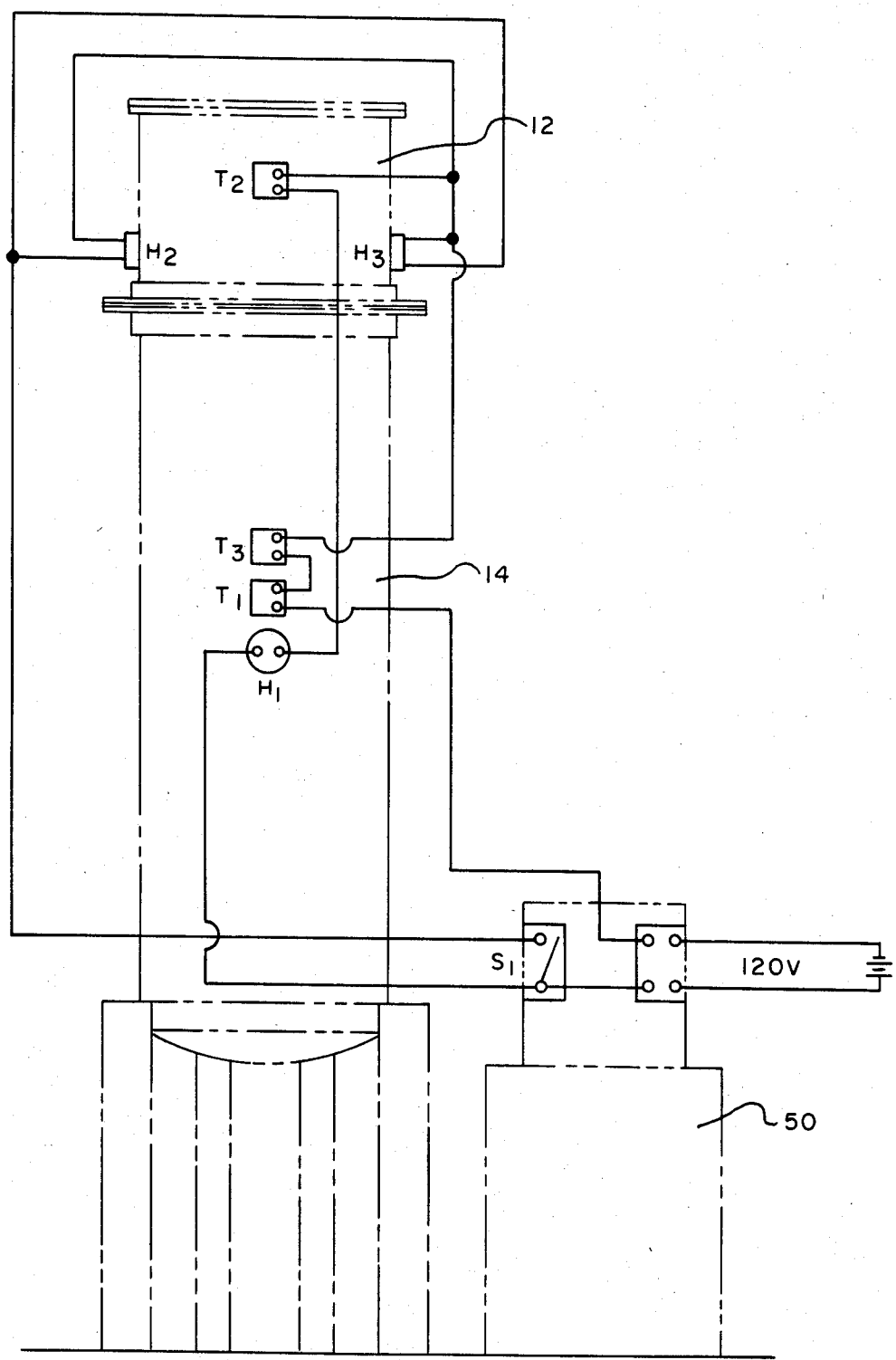
FIG. 5 is a schematic diagram of the electrical circuit of an apparatus of the present invention.

FIG. 5 is a schematic diagram of the electrical wiring circuit to control and operate the apparatus illustrated in FIGS. 1-4. Thermostat $T_1$ and thermostat $T_3$ read the temperature of the hot water in tank 14 at a point somewhat below the water level and thus at an intermediate temperature level of the water in tank 14. $T_1$ opens at 140 degrees F. and closes at 120 degrees F. $T_3$ opens at 195 degress Fahrenheit and closes manually. Thermostat $T_2$ is positioned to read the water temperature in distillation apparatus 10 and opens at 170 degrees F. and closes at 150 degrees F. Heater 18 herein designated heater $H_1$ provides auxillary heat to water in tank 14 while heaters 56 and 57 (designated $H_2$ and $H_3$ here) provide heat to the still of distillation apparatus 10. Although not pictured in FIGS. 1-4, a float is provided in container 50 such that when the water in distilled water tank reaches a preset level switch $S_1$ is tripped. In operation, when the unit is cold and the distilled water tank is empty, $S_1$ is closed and there is current to heaters $H_1$, $H_2$ and $H_3$. When the distilled temperature at $T_2$ reaches 170 degrees F., $T_2$ is opened and there is no current to $H_1$. When the distilled water tank is full, $S_1$ is open and there is no current to heaters $H_1$, $H_2$ and $H_3$. When the still is full and the temperature falls to 150 degrees F. at $T_2$, $T_2$ is closed and there is current to heater $H_1$. When the hot water tank temperature reaches 140 degrees F. at $T_1$, $T_1$ is open and there is no current to any of the heaters. When the hot water tank temperature reaches 195 degrees F. at $T_3$, $T_3$ is open and there is no current to any of the heaters until the tank cools and $T_3$ is manually reset.

While this invention has been described with reference to the specific embodiments disclosed herein, it is not confined to the details set forth and the patent is intended to include modifications and changes which may come within and extend from the following claims.

I claim:

1. In a water distilling and hot water heating apparatus comprising a domestic hot water supply meas including a hot water tank, a feed means to the hot water tank and a withdrawal means from said tank, the improvement comprising:
   (a) a water still means for holding water, leaving a vapor space above the water, comprising a closed container,
   (b) a feed water supply means, for providing at the said still, water at a rate of flow in excess of the rate of flow of distilled water,
   (c) a heating means to vaporizing the water in the container,
   (d) a waste water exit port means for removing any liquid water accumulating above a water level in the container,
   (e) a water vapor exit port means, positioned above the water level in the vapor space, for withdrawing water vapor from the said container,
   (f) means connected to the water vapor exit port, and extending through a substantial length of the hot water tank, for conducting the water vapor and for transferring the heat of condensation of the water vapor from said still the water in the hot water tank, and
   (g) means connected to the waste water exit port, and extending through a substantial length of the hot water tank, for transferring the latent heat of the waste water to the water in the hot water tank.

2. The apparatus of claim 1 further comprising means for adjusting the heating means for withdrawing the distilled water at a flow rate about equal to that of the waste water flow rate out of the container.

3. The apparatus of claim 1 wherein the waste water exit port means comprises a vertical tube, having an opening at a height level within the container, with the opening of size to remove any water accumulating above that level, wherein the tube is positioned within a separate housing.

4. The apparatus of claim 3 wherein the the housing comprises a vertical cylinder closed at the upper end, and open at the lower end, with the open end of the cylinder extending below the tube opening and the water level in the container.

5. The apparatus of claim 3, wherein a plate, is attached to the vertical tube and positioned below the cylinder opening, is of a horizontal plane area larger than the horizontal plane area of said opening.

6. The apparatus of claim 1 wherein the water vapor exit port means, comprises a vertical tube extending into the vapor space, an opening in the tube into the vapor space, and a protecting means to prevent droplets of water from entering the opening.

7. The apparatus of claim 4 wherein the protecting means is a curve in the tube to place the opening in a vertically downward direction.

8. The apparatus of claim 1 further comprising:
   (a) a closed chamber means, located inside the closed container, for holding a quantity of water, leaving a vapor space above the water level,
   (b) means defining an opening in the chamber to receive water from the feed water supply,
   (c) an outlet means in the chamber below the water level in the closed container for maintaining the level of the water in the chamber means and the closed container at about the same level, and
   (d) a vapor vent means in the chamber for venting vapors to the atmosphere,
   wherein the construction and position of the chamber means is such that heat transfer from the heated water in the closed container heats water in the chamber to a temperature approaching that of the boiling point of water.

9. The apparatus of claim 1 wherein the apparatus further comprises a vapor vent means in the hot water tank venting vapors to the atmosphere.

10. In a water distilling and hot water heating apparatus comprising a domestic hot water supply mean including a hot water tank, a feed means to the hot water tank and a withdrawal means from said tank, the improvement comprising:
   (a) a still means comprising an enclosed first container, located at the top of the hot water tank for holding water, leaving a vapor space above a water level,
   (b) a feed water supply means for providing a water at the said still at a rate of flow in excess of the rate of flow withdraw, as distilled water,
   (c) a heating means for vaporizing the water in the first container,
   (d) a volatile organic compound removing means for venting to the atmosphere the volatile organic compounds comprising a second container positioned in heat conduction communication with the water in the first container, and means for allowing the water to flow from the second container into the first container
   (e) a waste water exit port means for removing any liquid water accumulating above a water level in the first container,
   (f) a water vapor exit port means, positioned above the water level in the vapor space, for with drawing the water vapor,
   (g) means connected to the water vapor exit port, and extending through a substantial length of the hot water tank, for conducting the water vapor and for transferring the heat of condensation of the water vapor from said still to the water in the hot water tank, and
   (h) means connected to the waste water exit port, and extending through a substantial length of the hot water tank, for transferring the latent heat of the waste water to the water in the hot water tank.

* * * * *